United States Patent
Sumizawa

(10) Patent No.: US 10,157,187 B2
(45) Date of Patent: Dec. 18, 2018

(54) INFORMATION TERMINAL AND PROGRAM

(71) Applicant: Clarion Co., Ltd., Saitama-shi, Saitama (JP)

(72) Inventor: Akio Sumizawa, Sagamihara (JP)

(73) Assignee: Clarion Co., Ltd., Saitama-shi (JP)

( * ) Notice: Subject to any disclaimer, the term of this patent is extended or adjusted under 35 U.S.C. 154(b) by 232 days.

(21) Appl. No.: 14/352,921

(22) PCT Filed: Oct. 19, 2012

(86) PCT No.: PCT/JP2012/077070
§ 371 (c)(1),
(2) Date: Apr. 18, 2014

(87) PCT Pub. No.: WO2013/058356
PCT Pub. Date: Apr. 25, 2013

(65) Prior Publication Data
US 2014/0280076 A1    Sep. 18, 2014

(30) Foreign Application Priority Data

Oct. 21, 2011  (JP) .................................. 2011-231507

(51) Int. Cl.
*G08G 1/09*   (2006.01)
*G01C 21/36*  (2006.01)
(Continued)

(52) U.S. Cl.
CPC ... *G06F 17/30241* (2013.01); *G01C 21/3679* (2013.01); *G06F 17/30424* (2013.01);
(Continued)

(58) Field of Classification Search
CPC .......... G06F 17/30; G06F 9/548; G06F 19/18; G06F 19/28
See application file for complete search history.

(56) References Cited

U.S. PATENT DOCUMENTS

2003/0036848 A1* 2/2003 Sheha ................ G01C 21/3679
                                                                701/468
2004/0260788 A1  12/2004 Miyano et al.
(Continued)

FOREIGN PATENT DOCUMENTS

JP   2001-304874 A   10/2001
JP   2004-354302 A   12/2004
(Continued)

OTHER PUBLICATIONS

Supplemental European Search Report dated May 21, 2015 (Eight (8) pages).

(Continued)

*Primary Examiner* — Pierre M Vital
*Assistant Examiner* — Alicia M Antoine
(74) *Attorney, Agent, or Firm* — Crowell & Moring LLP

(57) ABSTRACT

The present invention provides a technology capable of allowing a user to search and retrieve facilities in an appropriate manner. An information terminal includes a facility storage unit for storing information on facilities, a first facility search unit for searching and retrieving the facilities stored based on a designated search condition, and a second facility search unit for requesting, via a network, a facility information providing device for providing the information on the facilities to provide facility information based on the designated search condition. It is determined which of the first and second facility search units is to be used to search and retrieve the facilities, and the results retrieved by the first or the second unit are displayed.

11 Claims, 10 Drawing Sheets

(51) Int. Cl.
*G06F 17/30* (2006.01)
*G08G 1/0962* (2006.01)
*G08G 1/0967* (2006.01)

(52) U.S. Cl.
CPC ........... *G08G 1/0962* (2013.01); *G08G 1/091* (2013.01); *G08G 1/096716* (2013.01); *G08G 1/096758* (2013.01); *G08G 1/096783* (2013.01)

(56) References Cited

U.S. PATENT DOCUMENTS

| | | | | |
|---|---|---|---|---|
| 2007/0088681 | A1* | 4/2007 | Aravamudan | G06F 17/3056 707/999.003 |
| 2007/0219982 | A1* | 9/2007 | Piper | G06F 17/3043 |
| 2009/0271400 | A1* | 10/2009 | Uchida | G01C 21/3611 701/532 |
| 2010/0063877 | A1* | 3/2010 | Soroca | G06F 17/30749 705/14.45 |
| 2010/0114941 | A1* | 5/2010 | Von Kaenel | G06F 17/30241 707/769 |
| 2010/0248745 | A1* | 9/2010 | Ozawa | G01C 21/20 455/456.3 |
| 2010/0291950 | A1* | 11/2010 | Lin | H04W 4/02 455/456.3 |
| 2011/0131233 | A1* | 6/2011 | DeLuca | G06F 17/30967 707/769 |
| 2011/0191330 | A1* | 8/2011 | Barve | G06F 17/30 707/723 |
| 2011/0196605 | A1* | 8/2011 | Severson | G01C 21/3611 701/533 |
| 2012/0066240 | A1* | 3/2012 | Morimoto | G06F 17/30241 707/758 |

FOREIGN PATENT DOCUMENTS

| | | |
|---|---|---|
| JP | 2006-90867 A | 4/2006 |
| JP | 2007-248365 A | 9/2007 |
| JP | 2007-278807 A | 10/2007 |
| JP | 2011-210136 A | 10/2011 |

OTHER PUBLICATIONS

International Search Report (PCT/ISA/220 & PCT/ISA/210) with English translation dated Nov. 20, 2012 (9 pages).
Japanese-language Written Opinion (PCT/ISA/237) dated Nov. 20, 2012 (5 pages).
Japanese Notice of Reasons for Revocation issued in counterpart Japanese Application No. 2016-700616 dated Oct. 27, 2016 with English translation (23 pages).

\* cited by examiner

LINK TABLE 200

INFORMATION TERMINAL AND PROGRAM

TECHNICAL FIELD

The present invention relates to a technology for an information terminal. The present invention claims priority from Japanese Patent Application No. 2011-231507 filed on Oct. 21, 2011, the disclosure of which is incorporated herein by reference in designated states that allow incorporation of a document by reference.

BACKGROUND ART

Hitherto, in navigation devices, there is employed a technology for searching and retrieving points of interest (POIs) such as facilities stored in a storage device with use of a keyword or the like. The technology involves not only searching and retrieving of the POI or the like with use of an address and a phone number but also searching and retrieving of the POIs including a designated search (retrieval) word, to thereby display results thereof in a list format. In Patent Literature 1, there is disclosed a technology relating to a navigation device of this type.

CITATION LIST

Patent Literature

[PTL 1] JP 2007-248365 A

SUMMARY OF INVENTION

Technical Problem

In such navigation device as described above, a processing load becomes heavier as a search condition becomes more complex and as targets to be searched are increased, and as a result, there are cases where a response of display may become slower. In addition, information on facilities and the like stored in the storage device may become obsolete with time. In such case, not only it takes a long time to execute a search and retrieval, but results that are no longer effective are undesirably retrieved.

It is an object of the present invention to provide a technology capable of allowing a user to search and retrieve facilities in an appropriate manner.

Solution to Problem

In order to solve the above-mentioned problem, according to the present invention, there is provided an information terminal, including: facility storage means for storing information on facilities; a first facility search means for searching and retrieving the facilities stored in the facility storage means based on a designated search condition; a second facility search means for requesting, via a network, a facility information providing device for providing the information on the facilities to provide facility information based on the designated search condition; search method determination means for determining which of the first facility search means and the second facility search means is to be used to search and retrieve the facilities; and result displaying means for displaying results retrieved by the first facility search means or the second facility search means.

Further, according to the present invention, there is provided a program for causing a computer to execute a procedure for searching and retrieving facilities, the program further causing the computer to function as: control means; facility storage means for storing information on the facilities; a first facility search means for searching and retrieving the facilities stored in the facility storage means based on a designated search condition; and a second facility search means for requesting, via a network, a facility information providing device for providing the information on the facilities to provide facility information based on the designated search condition, the program further causing the control means to execute: a search method determination procedure of determining which of the first facility search means and the second facility search means is to be used to search and retrieve the facilities; and a result displaying procedure of displaying results retrieved by the first facility search means or the second facility search means.

Further, according to the present invention, there is provided a method of searching and retrieving facilities performed by an information terminal, the information terminal including: facility storage means for storing information on the facilities; a first facility search means for searching and retrieving the facilities stored in the facility storage means based on a designated search condition; and a second facility search means for requesting, via a network, a facility information providing device for providing the information on the facilities to provide facility information based on the designated search condition, the method including a search method determination step of determining which of the first facility search means and the second facility search means is to be used to search and retrieve the facilities; and a result displaying step of displaying results retrieved by the first facility search means or the second facility search means.

Advantageous Effects of Invention

According to the present invention, it is possible to provide the technology capable of allowing the user to search and retrieve the facilities in an appropriate manner.

DESCRIPTION OF EMBODIMENT

Now, referring to the accompanying drawings, a description is given of a navigation system to which one embodiment of the present invention is applied.

Figure 1:
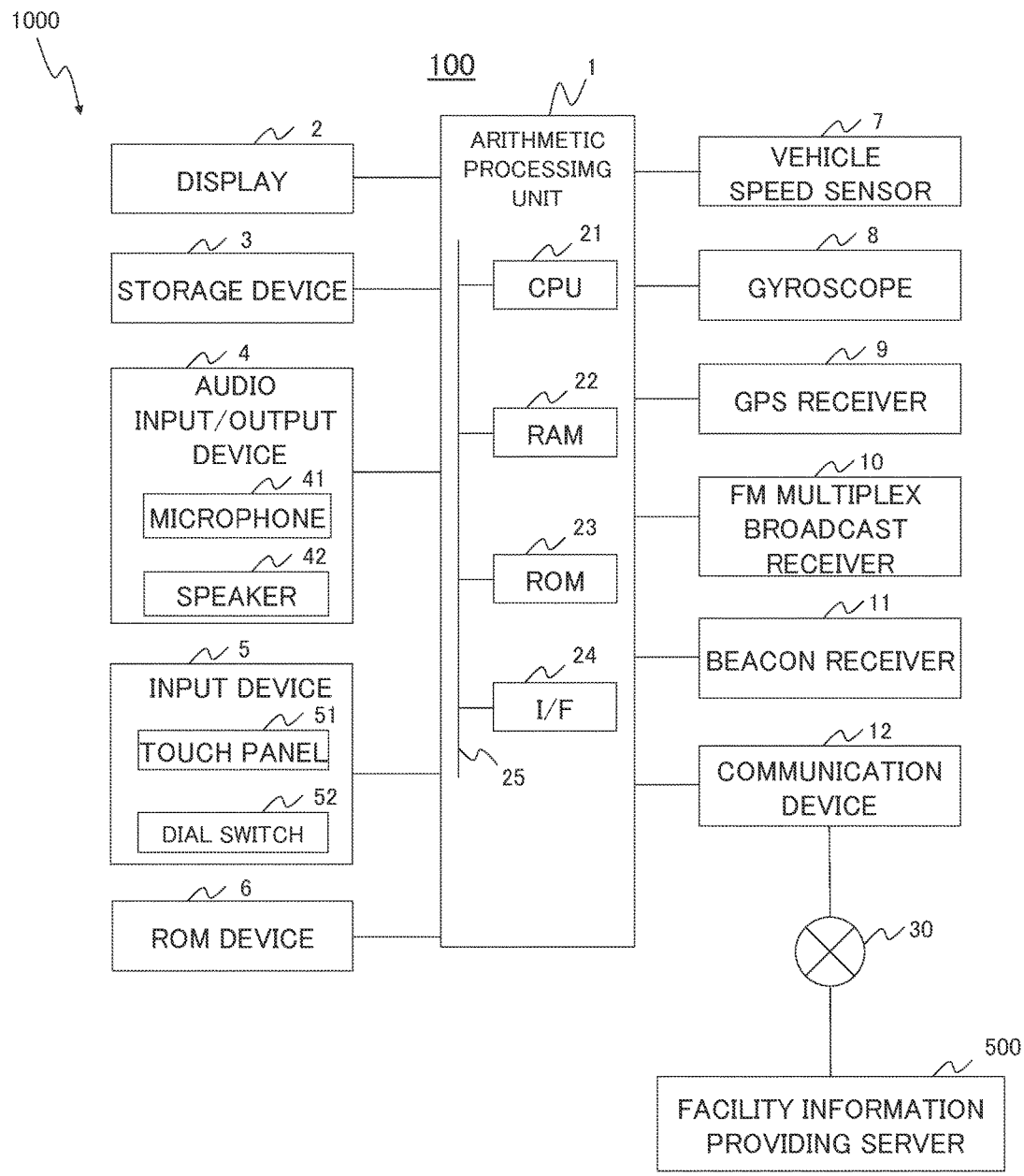
FIG. 1 is a diagram illustrating a schematic configuration of a navigation system according to one embodiment of the present invention.

FIG. 1 is a diagram illustrating an overall configuration of a navigation system 1000. The navigation system 1000 includes a navigation device 100 and a facility information providing server 500, which is connectable to the navigation device 100 via a network 30. The navigation device 100 is what is called a navigation device capable of displaying map information to display a spot indicating a current location of the navigation device 100 and information for guiding a user along a route to a destination that has been set. The facility information providing server 500 is a device which receives a request for searching and retrieving facilities from other devices via the network 30 such as the Internet to return pieces of facility information, which are results retrieved by the search, as a response. Note that, the network 30 may be, for example, a wireless communication network such as a cellular phone network, a wired communication network, a combination of the wireless communication network and the wired communication network, or a closed network other than the Internet.

The navigation device 100 includes an arithmetic processing unit 1, a display 2, a storage device 3, an audio input/output device 4 (including a microphone 41 as an audio input device and a speaker 42 as an audio output device), an input device 5, a ROM device 6, a vehicle speed sensor 7, a gyroscope 8, a Global Positioning System (GPS) receiver 9, an FM multiplex broadcast receiver 10, a beacon receiver 11, and a communication device 12 which performs communication to/from other devices on the network 30.

The arithmetic processing unit 1 is a central unit which performs various kinds of processing. For example, the arithmetic processing unit 1 calculates the current location based on information output from various sensors including the sensors 7 and 8, the GPS receiver 9, the FM multiplex broadcast receiver 10, and the like. Based on the acquired information on the current location, the arithmetic processing unit 1 further reads out map data necessary for display from the storage device 3 or the ROM device 6.

The arithmetic processing unit 1 develops the map data read out as graphics, and superimposes a mark indicating the current location on the graphics to display the resultant on the display 2. The arithmetic processing unit 1 uses the map data and the like stored in the storage device 3 or the ROM device 6 to search for an optimal route (recommended route) that connects a departure location designated by the user or the current location to the destination (which may be a via point or a stop-off point). The arithmetic processing unit 1 also uses the speaker 42 or the display 2 to guide the user.

When an instruction to search for the destination or the via point, which is set at the time of a route guidance, is given, the arithmetic processing unit 1 receives specification of a search condition to search for a POI satisfying the condition and displays search results in a selectable manner. In this search, the arithmetic processing unit 1 searches data on the POIs stored in the storage device 3 or the ROM device 6 of the navigation device 100. When a search is the one of a predetermined kind or the one satisfying a predetermined search condition, the arithmetic processing unit 1 requests, via the network 30, the facility information providing server 500 to execute the search, and displays search results in a selectable manner when receiving the search results.

The arithmetic processing unit 1 of the navigation device 100 has a configuration in which respective devices are connected through a bus 25. The arithmetic processing unit 1 includes a central processing unit (CPU) 21 which executes various kinds of processing including numerical processing and controlling of various devices, a random access memory (RAM) 22 which stores the map data read out from the storage device 3, calculation data, and the like, a read only memory (ROM) 23 which stores programs and data, and an interface (I/F) 24 for connecting various types of hardware to the arithmetic processing unit 1.

The display 2 is a unit which displays graphics information generated by the arithmetic processing unit 1 and other units. The display 2 includes, for example, a liquid crystal display or an organic EL display.

The storage device 3 includes a storage medium that is at least readable and writable such as a hard disk drive (HDD) or a non-volatile memory card.

This storage medium has stored thereon a link table 200, which is the map data (including link data on links constituting roads on a map) required for a commonly-used route search device, and a facility table 300 in which information specifying a facility such as the POI is stored.

Figure 2:
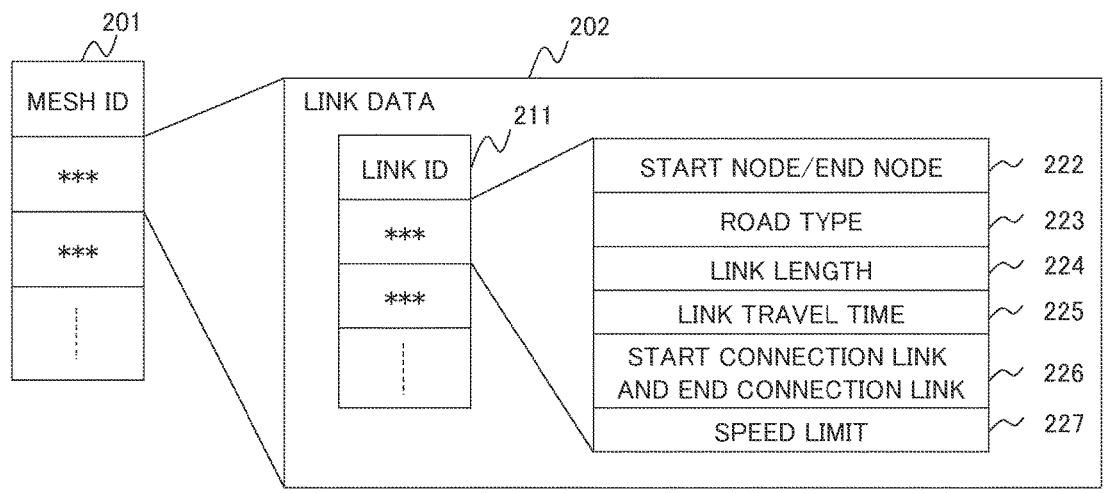
FIG. 2 is a diagram illustrating a configuration of a link table.

FIG. 2 is a diagram illustrating a configuration of the link table 200. The link table 200 includes, for each identification code (mesh ID) 201 of a mesh, which is a region on a map obtained by dividing the map, link data 202 on respective links constituting roads included in the mesh region.

The link data 202 includes, for each link ID 211 as an identifier of the link, coordinate information 222 on two nodes (start node and end node) constituting the link, a road type 223 indicating a type of a road including the link, a link length 224 indicating a length of the link, a link travel time 225 stored in advance, a start connection link and end connection link 226, a speed limit 227 indicating a speed limit of the road including the link, and the like. Note that, the start connection link and end connection link 226 is information specifying a start connection link, which is a link connected to the start node of the link, and an end connection link, which is a link connected to the end node of the link.

Note that, the two nodes constituting the link are distinguished from each other here as the start node and the end node in order to manage an up direction and down direction of the same road as separate links.

Figure 3:
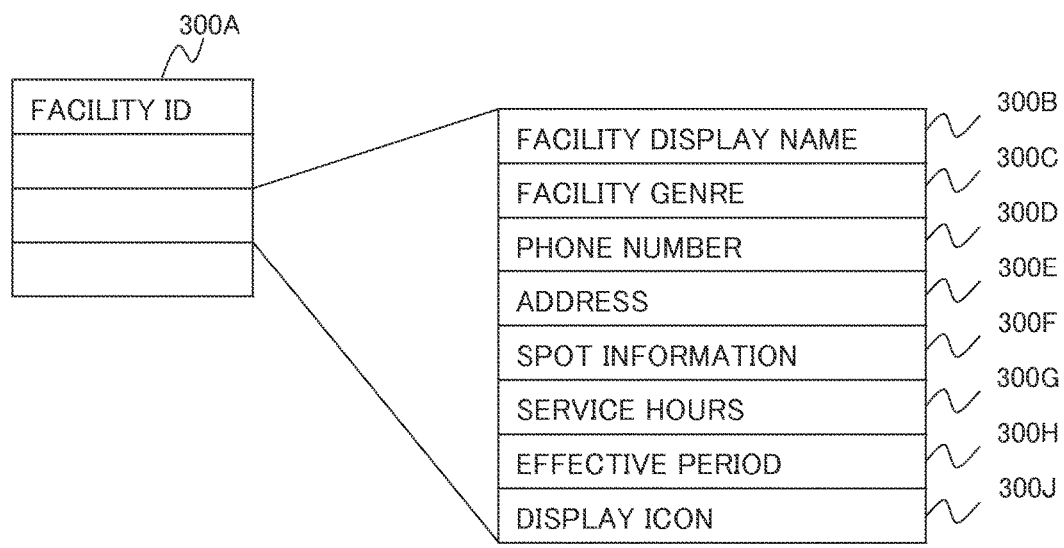
FIG. 3 is a diagram illustrating a configuration of a facility table.

FIG. 3 is a diagram illustrating a configuration of the facility table 300. The facility table 300 includes, for each facility ID 300A for identifying the point of interest (POI), information indicating attributes of the facility. The facility table 300 is, in other words, POI storage means which stores information on points of interest (POIs). Note that, the facilities include not only what is called buildings but also specific spots (for example, intersection, road junction, mountain peak, benchmark, and observation deck). The POI and the facility accordingly refer to substantially the same object.

A facility display name 300B is information specifying the name of the facility identified by the facility ID. Note that, the facility display name is not strictly limited to the name of the facility, and may be a commonly-known name, an abbreviated name, a nickname, or the like.

A facility genre 300C is information specifying a genre of the facility identified by the facility ID. Examples of the genre include "public facility" such as a school and a government office, "station" such as a train station, "shopping mall", and "amusement park". Note that, the facility genre 300C may be a sub-genre, which is obtained by further segmenting the genre.

A phone number 300D is information specifying a phone number, which is contact information on the facility identified by the facility ID.

An address 300E is information specifying an address, which is address information on the facility identified by the facility ID.

Spot information 300F is information specifying a position of the facility identified by the facility ID. The spot information 300F is, for example, information specifying a latitude, a longitude, and the like.

Service hours 300G are information specifying, in a case where the facility identified by the facility ID is a facility which provides a service, a time period in which the service is available. The service hours 300G are information specifying, for example, a time period of 9:00 to 17:30 on weekdays.

An effective period 300H is information specifying a period in which the information on the facility identified by the facility ID is effective. The effective period 300H is, for example, in a case where the facility is a site of an event such as a festival, information specifying a period in which the event is held at the site.

A display icon 300J is information specifying data on an icon to be used when the facility identified by the facility ID is displayed on the map. The display icon 300J is, for example, information on a number designating a predetermined icon or a design.

A description is given referring back to FIG. 1. The audio input/output device 4 includes the microphone 41 as the audio input device and the speaker 42 as the audio output device. The microphone 41 acquires sounds output from outside of the navigation device 100 such as a voice uttered by the user or other passengers.

The speaker 42 outputs a message to the user generated by the arithmetic processing unit 1 as a sound. The microphone 41 and the speaker 42 are separately mounted to predetermined parts of a vehicle. Alternatively, the microphone 41 and the speaker 42 may be accommodated into one casing in an integrated manner. The navigation device 100 may include a plurality of the microphones 41 and a plurality of the speakers 42.

The input device 5 is a device which receives an instruction given by the user through the user's operation. The input device 5 includes a touch panel 51, a dial switch 52, and a scroll key, a map scale key, and other such keys as other hard switches (not shown). The input device 5 further includes a remote controller capable of remotely giving an operation instruction to the navigation device 100. The remote controller includes a dial switch, a scroll key, a map scale key, and the like, and is capable of sending information received by the respective keys and switches to the navigation device 100.

The touch panel 51 is mounted on a display surface side of the display 2, and a display screen can be seen through the touch panel 51. The touch panel 51 specifies a touched position corresponding to X and Y coordinates on an image displayed on the display 2, and converts the touched position into coordinates for output. The touch panel 51 includes a pressure-sensitive or capacitive input detection device and the like.

The dial switch 52 is rotatable in clockwise and counterclockwise directions. The dial switch 52 generates a pulse signal at every rotation of a predetermined angle and outputs the generated pulse signal to the arithmetic processing unit 1. The arithmetic processing unit 1 determines a rotation angle based on the number of pulse signals.

The ROM device 6 includes a storage medium that is at least readable such as a CD-ROM, a DVD-ROM, or another type of ROM and an integrated circuit (IC) card. On this storage medium, for example, video data and audio data are stored.

The vehicle speed sensor 7, the gyroscope 8, and the GPS receiver 9 are used by the navigation device 100 to detect the current location (position of the vehicle itself). The vehicle speed sensor 7 is a sensor which outputs a value to be used in order to calculate a vehicle speed. The gyroscope 8 includes a fibre optic gyroscope, a vibrating structure gyroscope, or the like, and detects an angular velocity generated by rotation of a moving object. The GPS receiver 9 receives a signal transmitted from a GPS satellite and measures a distance between the moving object and the GPS satellite and a change rate of the distance. The GPS receiver 9 performs this measurement with respect to three or more satellites to measure the current location, traveling speed, and traveling direction of the moving object.

The FM multiplex broadcast receiver 10 receives an FM multiplex broadcast signal transmitted from an FM broadcast station. Transmitted as the FM multiplex broadcast are, for example, brief current traffic information as Vehicle Information Communication System (VICS: trademark) information, traffic regulation information, service area/parking area (SA/PA) information, parking lot information, and weather information and textual information broadcast by a radio station as FM multiplex general information.

The beacon receiver 11 receives brief current traffic information such as VICS information, traffic regulation information, service area/parking area (SA/PA) information, parking lot information, weather information, and an emergency alarm. The beacon receiver 11 is, for example, an optical beacon which performs communication with the use of light or a radio wave beacon which performs communication with the use of radio waves.

The communication device 12 performs communication to/from other devices on the network 30, which is the wireless communication network established via the cellular phone network or a PHS network. The communication device 12 performs communication to/from the facility information providing server 500 in this case.

Figure 4:
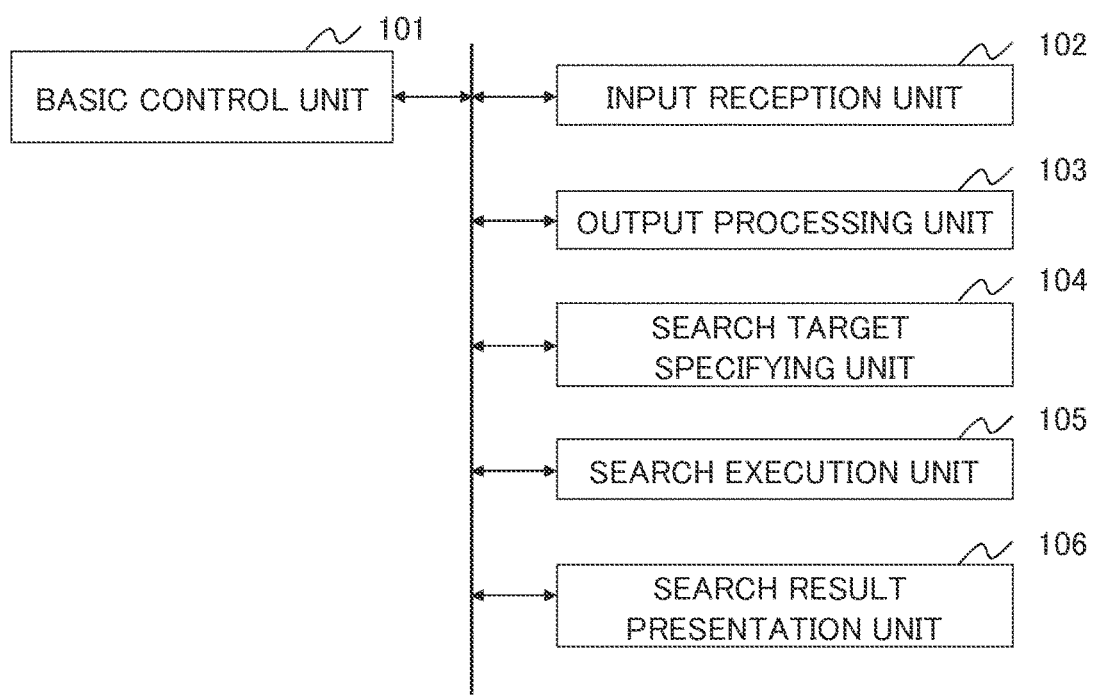
FIG. 4 is a functional configuration diagram of an arithmetic processing unit.

FIG. 4 is a functional block diagram of the arithmetic processing unit 1. As illustrated in FIG. 4, the arithmetic processing unit 1 includes a basic control unit 101, an input reception unit 102, an output processing unit 103, a search target specifying unit 104, a search execution unit 105, and a search result presentation unit 106.

The basic control unit 101 is a central function unit which performs various kinds of processing, and controls other processing units depending on its details of processing. The basic control unit 101 also acquires information from the various sensors, the GPS receiver 9, and the like, and performs, for example, map matching processing thereon to specify the current location. The basic control unit 101 associates a date and time of travel with a position thereof as needed and stores a travel history in the storage device 3 for each link. The basic control unit 101 further outputs a current time in response to a request issued from the respective processing units.

The basic control unit 101 also searches for the optimal route (recommended route) that connects the departure location designated by the user or the current location to the destination. In the route search, the basic control unit 101 uses a route search logic such as the Dijkstra's algorithm to search for a route based on link costs, which are set in advance for predetermined road sections (links).

In order to prevent the current location of the vehicle from deviating from the recommended route, the basic control unit 101 also guides the user's driving operation with use of the speaker 42 and the display 2.

The input reception unit 102 receives an instruction input by the user through the input device 5 or the microphone 41, and passes the instruction to the basic control unit 101. For example, when the user issues a request for a search for the recommended route, the input reception unit 102 requests the basic control unit 101 to perform processing of displaying the map on the display 2 in order to set the destination.

The output processing unit 103 receives information on a screen to be displayed such as polygon information, converts the information into a signal for drawing on the display 2, and instructs the display 2 to perform drawing.

The search target specifying unit 104 specifies data to be a source of a search target based on a search type or a search condition of the POI search. More specifically, when the POI search is a search by a plurality of keywords, the search target specifying unit 104 specifies the search target so as to execute a search based on information stored in the facility information providing server 500 (remote search).

When the POI search is a search by an address or a phone number, the search target specifying unit 104 specifies the search target so as to execute a search based on information stored in the storage device 3 or the ROM device 6 (local search).

When a genre of the POI to be retrieved is a predetermined genre, for example, a genre such as a restaurant, which is a facility relatively more likely to be changed, the search target specifying unit 104 specifies the search target so as to execute, in addition to a search based on the information stored in the storage device 3 or the ROM device 6, a search based on the information stored in the facility information providing server 500 (local and remote search). When the genre of the POI to be retrieved is a genre such as a public facility, which is a facility relatively less likely to be changed, the search target specifying unit 104 specifies the search target so as to execute a search based on the information stored in the storage device 3 or the ROM device 6 (local search). In other words, the search target specifying unit 104 is search method determination means which determines, based on a designated search condition, which of local POI search means and remote POI search means is to be used to search for the POI.

The search execution unit 105 searches the search target specified by the search target specifying unit 104. Specifically, when a search based on the storage device 3 or the ROM device 6 (local search) is executed, the search execution unit 105 uses the facility table 300 to execute a search by a designated method. When a search based on the information stored in the facility information providing server 500 (remote search) is executed, on the other hand, the search execution unit 105 requests the facility information providing server 500 to search and retrieve the facility information to retrieve search results.

Even when a search based on the storage device 3 or the ROM device 6 (local search) is executed, in a case where there are no results retrieved (0 hits), the search execution unit 105 executes a search based on the information stored in the facility information providing server 500 (remote search) to retrieve search results. Similarly, even when a search based on the information stored in the facility information providing server 500 (remote search) is executed, in a case where there are no results retrieved (0 hits), the search execution unit 105 uses the facility table 300 to execute a search by the designated method (local search) to retrieve search results.

When a search based on the information stored in the facility information providing server 500 is executed in addition to a search based on the information stored in the storage device 3 or the ROM device 6, the search execution unit 105 retrieves results of an all search (local and remote search). In other words, the search execution unit 105 is POI search means which searches the POIs stored in the POI storage means which stores the information on the points of interest (POIs) based on a designated search condition, and is also POI search means which requests, via the network, a POI information providing device which provides the information on the POIs to provide POI information based on the designated search condition.

The search result presentation unit 106 generates display information for outputting information of the results retrieved by the search execution unit 105 to present the generated display information. Specifically, the search result presentation unit 106 generates the display information in such a manner that the search results are selectable in a list format, and requests the output processing unit 103 to output the display information. Note that, when generating the display information, in a case where both the results of the local search and the results of the remote search have been retrieved, the search result presentation unit 106 merges the results of both searches to generate the list. In the merging processing, duplicated facilities are deduplicated to merge the results of both searches. Note that, the duplicated facilities refer to the ones having the same facility ID or the ones having the same facility display name.

The above-mentioned function units of the arithmetic processing unit 1, that is, the basic control unit 101, the input reception unit 102, the output processing unit 103, the search target specifying unit 104, the search execution unit 105, and the search result presentation unit 106 are each built by the CPU 21 reading and executing a predetermined program. The program for implementing processing of the respective function units is therefore stored in the RAM 22.

Note that, the above-mentioned respective components are the ones obtained by classifying the configuration of the navigation device 100 based on their main processing details in order to facilitate understanding. The invention of this application is accordingly not limited by a method for classification of the components and their names. The configuration of the navigation device 100 may be further classified into a larger number of components based on their processing details. The configuration of the navigation device 100 may be further classified into other components so that each component performs larger pieces of processing.

The respective function units may be built from hardware (such as an ASIC and a GPU). The processing of the respective function units may be executed by one piece of hardware, or may be executed by a plurality of pieces of hardware.

Figure 5:
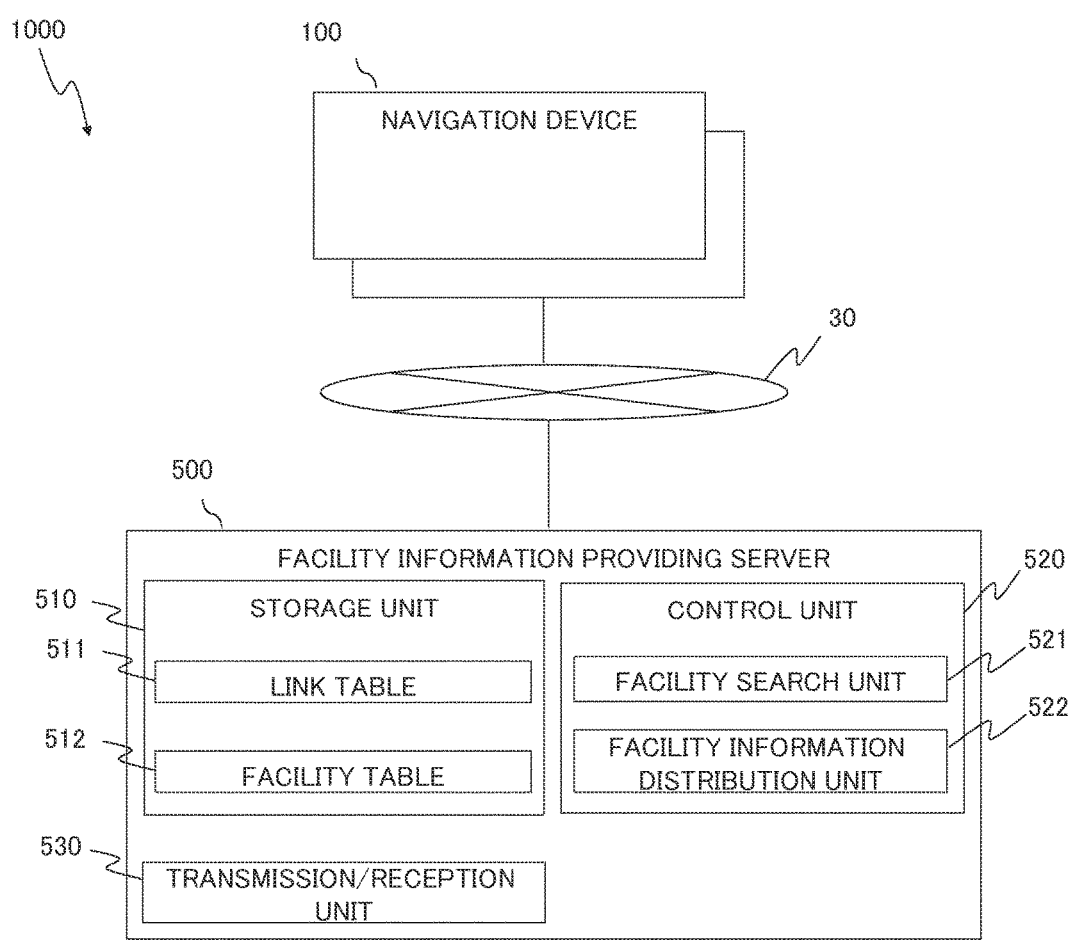
FIG. 5 is a schematic configuration diagram of a facility information providing server.

FIG. 5 is a diagram illustrating an overview of the facility information providing server 500 according to this embodiment. The facility information providing server 500 includes a storage unit 510 in which a link table 511 and a facility table 512 are stored, a control unit 520 including a facility search unit 521 which searches and retrieve the facilities and a facility information distribution unit 522 which transmits facility information retrieved as a result of the search, and a transmission/reception unit 530 which communicates via the network 30 to/from other devices, in particular, the navigation device 100.

The link table 511 and the facility table 512 stored in the storage unit 510 have the same data configurations as those of the link table 200 and the facility table 300, which have been described with reference to FIGS. 2 and 3, respectively, and hence descriptions thereof are omitted.

The facility search unit 521 receives a search instruction from the navigation device 100 and the like via the network 30 and searches the link table 511 and the facility table 512 in a manner that suits the search instruction to retrieve results.

The facility information distribution unit 522 transmits the results of the search retrieved by the facility search unit 521 to the navigation device 100 and the like that have issued the search instruction. In other words, the facility information distribution unit 522 passes a list of POIs retrieved in accordance with a condition indicated by the search instruction to the transmission/reception unit and instructs the transmission/reception unit to transmit the list.

The transmission/reception unit 530 communicates to/from other devices via the network 30. Specifically, the transmission/reception unit 530 receives the search instruction from another device and returns the search results to the another device.

Figure 6:
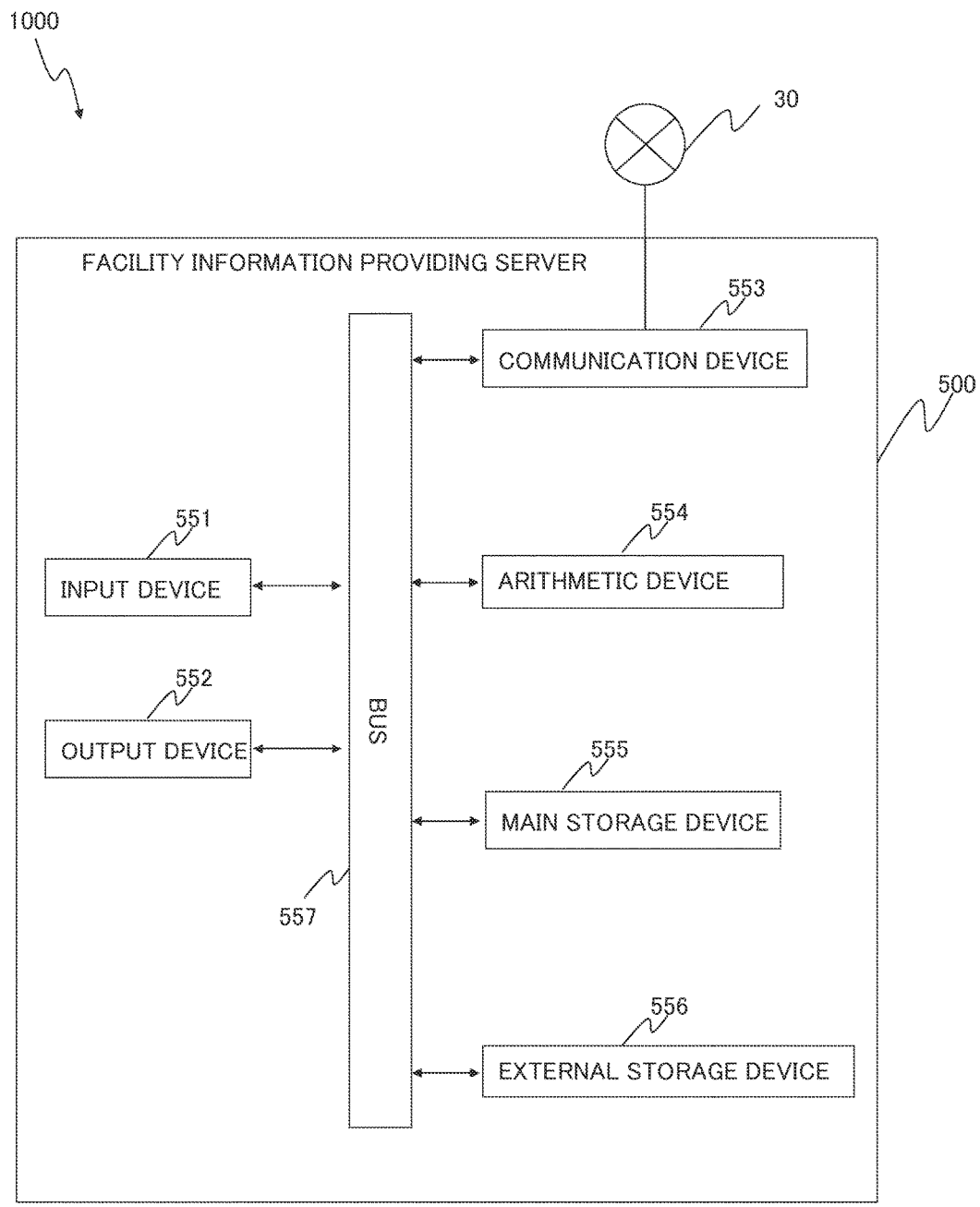
FIG. 6 is a diagram illustrating an example of a hardware configuration of the facility information providing server.

FIG. 6 is a diagram illustrating an example of a hardware configuration of the facility information providing server 500. The facility information providing server 500 includes an input device 551, an output device 552, a communication device 553, an arithmetic device 554, a main storage device 555, and an external storage device 556. The respective devices are connected to one another through a bus 557. Note that, the input device 551 and the output device 552 are not essential components, and may be provided as needed.

The input device 551 is a device which receives an input, such as a keyboard and a mouse, or a touch pen or other such pointing devices. The output device 552 is a device which performs display such as a display. The communication device 553 is a device which communicates to/from other devices via a network such as the network 30. The communication device 553 of the facility information providing server 500 can communicate to/from the communication device 12 of the navigation device 100 and the like via the network 30. The arithmetic device 554 is an arithmetic device such as a central processing unit (CPU). The main storage device 555 is a memory device such as a random access memory (RAM). The external storage device 556 is a non-volatile storage device such as a hard disk drive or a solid state drive (SSD).

Note that, an instruction code to be expanded onto the main storage device 555 may be stored in the external storage device 556, or may be obtained via the communication device 553 from another device (not shown) on the network 30 or a device on another network such as the Internet. The main storage device 555 has an area in which the instruction code to be executed by the arithmetic device 554 is expanded. The external storage device 556 is what is called a storage device which is commonly used, and has recorded thereon in advance software for operating the facility information providing server 500, an initial value of data required for the software, other types of data, and the like.

The above-mentioned facility search unit 521 and facility information distribution unit 522 of the control unit 520 of the facility information providing server 500 are built by the arithmetic device 554 reading and executing a predetermined program. The program for implementing processing of the respective function units is therefore stored in the main storage device 555.

Note that, the above-mentioned respective components of the facility information providing server 500 are the ones obtained by classifying the configuration of the facility information providing server 500 based on their main processing details in order to facilitate understanding of the configuration. The invention of this application is accordingly not limited by a method for classification of the components and their names. The configuration of the facility information providing server 500 may be further classified into a larger number of components based on their processing details. The configuration of the facility information providing server 500 may be further classified into other components so that each component performs larger pieces of processing.

The control unit 520 of the facility information providing server 500 may be built from hardware (such as an ASIC and a GPU). The processing of the respective function units may be executed by one piece of hardware, or may be executed by a plurality of pieces of hardware.

[Description of Operation]

Figure 7:
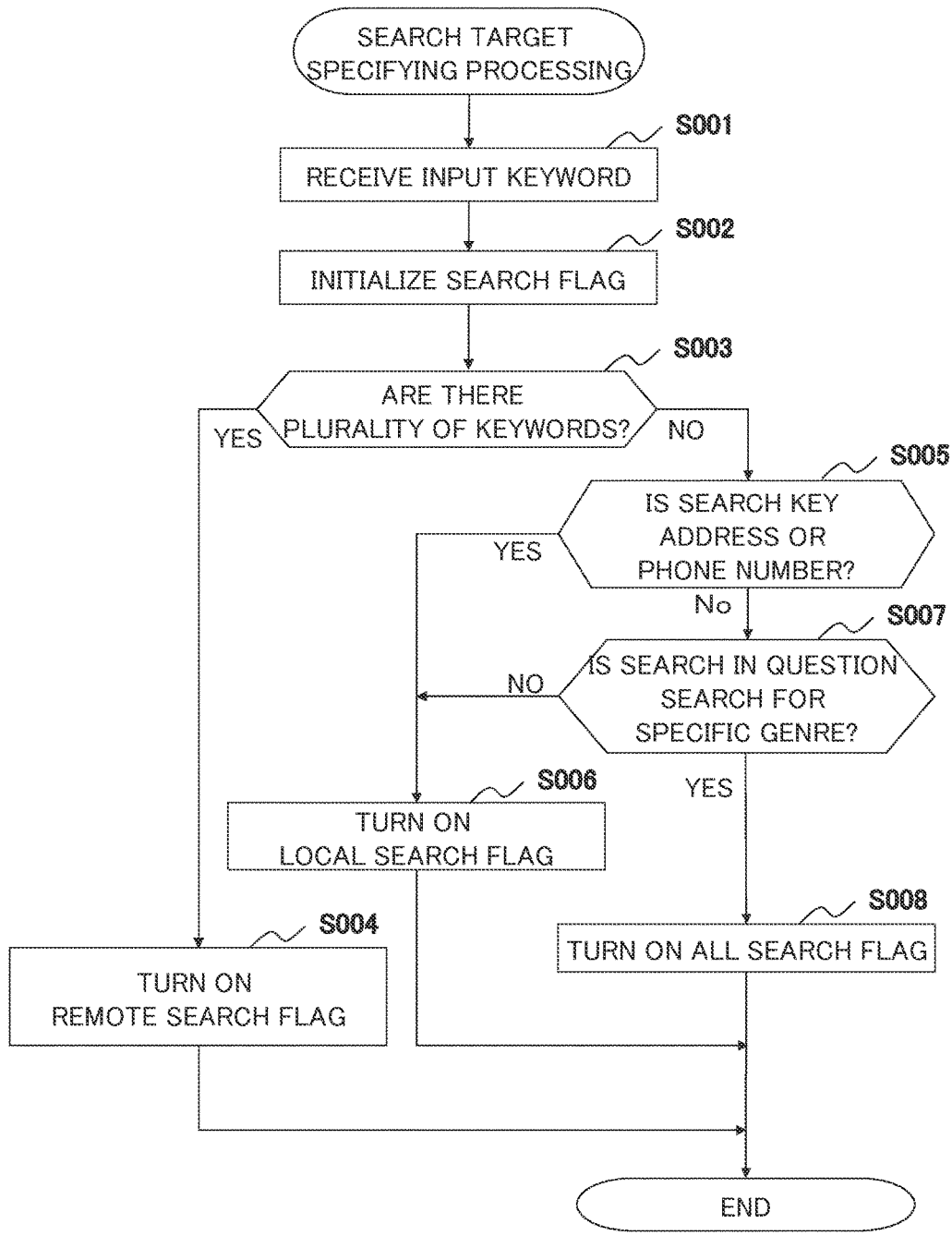
FIG. 7 is a flow chart of search target specifying processing.

Next, a description is given of an operation of search target specifying processing executed by the navigation device 100. FIG. 7 is a flow chart illustrating the search target specifying processing executed by the navigation device 100. This flow is started when the power of the navigation device 100 is turned on to activate the navigation device 100 and a predetermined search command, such as a genre designation free word search command or a neighboring region free word search command, is executed.

First, the search target specifying unit 104 receives an input keyword (Step S001). Specifically, the search target specifying unit 104 acquires, as the input keyword, a search word input on a search information input screen through the input reception unit 102. Note that, when there are a plurality of search words, the search target specifying unit 104 distinguishes the search words from one another based on a predetermined delimiter character such as a space.

Next, the search target specifying unit 104 initializes a search flag (Step S002). Specifically, the search target specifying unit 104 initializes each of a remote search flag, a local search flag, and an all search flag, which are used as the search flags, to make settings in order to turn OFF the flags. Note that, the local search flag is flag information for specifying whether the local search is to be executed, and is, for example, binary information of ON/OFF. The remote search flag is flag information for specifying whether the remote search is to be executed, and is, for example, binary information of ON/OFF. The all search flag is flag information for specifying whether both the local search and the remote search are to be executed, and is, for example, binary information of ON/OFF.

The search target specifying unit 104 determines whether or not the input keyword includes a plurality of search words (Step S003).

When the input keyword includes the plurality of search words, (when the determination of Step S003 results in "Yes"), the search target specifying unit 104 turns ON the remote search flag (Step S004). The search target specifying unit 104 then brings the search target specifying processing to an end.

When the input keyword does not include the plurality of search words (when the determination of Step S003 results in "No"), the search target specifying unit 104 determines whether or not a search key is an address or a phone number (Step S005). Specifically, the search target specifying unit 104 determines whether or not information input as the input keyword constitutes a part of an address or a phone number. The search target specifying unit 104 determines, for example, that the search key is an address or a phone number.

When the search key is an address or a phone number (when the determination of Step S005 results in "Yes"), the search target specifying unit 104 turns ON the local search flag (Step S006). The search target specifying unit 104 then brings the search target specifying processing to an end.

When the search key is not an address or a phone number (when the determination of Step S005 results in "No"), the search target specifying unit 104 determines whether or not the search in question is the one that limits a genre of the search target to a specific genre (Step S007). Specifically, the search target specifying unit 104 determines whether or not a search command that has brought the search target specifying processing to a start involves the designation of a genre, or determines whether or not the designated genre is a predetermined genre, for example, the predetermined genre that involves a frequent change such as a restaurant.

When the search in question is not a search for the specific genre (when the determination of Step S007 results in "No"), the search target specifying unit 104 proceeds the control to Step S006.

When the search in question is a search for the specific genre (when the determination of Step S007 results in "Yes"), the search target specifying unit 104 turns ON the all search flag (Step S008). The search target specifying unit 104 then brings the search target specifying processing to an end.

The processing flow of the search target specifying processing is as described above. According to the search target specifying processing, it is possible to specify which of the local search, the remote search, and both thereof is to be executed based on the type of search or the search condition. More specifically, when the search condition in question is a predetermined search condition that imposes a heavy processing load such as a search condition that uses the plurality of search words, or when the search condition in question is the one that specifies the type of the POI whose data is frequently updated such as a search condition that designates the specific genre, it is determined that searching and retrieving of the POIs is to be executed with use of the remote search.

Figure 8:
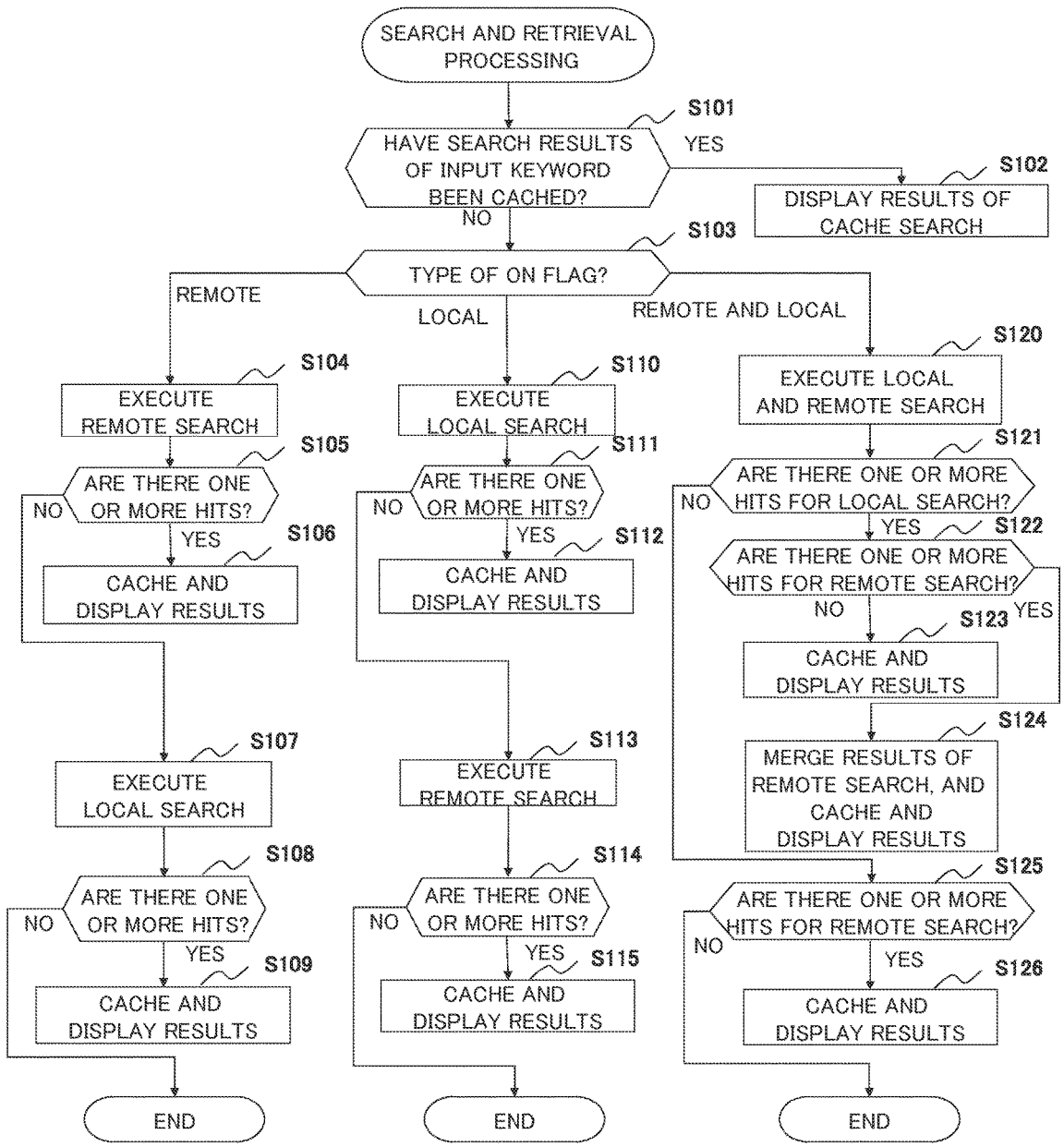
FIG. 8 is a flow chart of search and retrieval processing.

FIG. 8 is a diagram illustrating a processing flow of search and retrieval processing. The search and retrieval processing is started when the input reception unit 102 receives an input that instructs to execute a search under a state in which the search target has been specified by the search target specifying unit 104.

First, the search execution unit 105 determines whether or not search results of the input keyword have been cached (Step S101). Specifically, the search execution unit 105 searches cache information (not shown) of the search results provided on the RAM 22 to determine whether or not past search results retrieved by a keyword matching the input keyword are included in the cache information. When the search results have not been cached, the search execution unit 105 reads out results of the cache search. The search result presentation unit 106 then displays the results of the cache search that has been read out (Step S102). The search execution unit 105 then brings the search and retrieval processing to an end.

When the search results of the input keyword have not been cached (when the determination of Step S101 results in "No"), the search execution unit 105 determines a type of the search flag that is in the ON state (Step S103).

When the type of the search flag that is in the ON state is the remote search (when the determination of Step S103 results in "REMOTE"), the search execution unit 105 executes the remote search (Step S104). Specifically, the search execution unit 105 transmits other search conditions including the search word to the facility information providing server 500 and receives the search results transmitted from the facility information providing server 500. Note that, on the facility information providing server 500, the facility search unit 521 extracts, from the facility table 512, the POI that satisfies the received search condition and includes the search word. The facility information distribution unit 522 then lists the POIs retrieved as a result of the extraction to transmit the list to the navigation device 100. Note that, when there are no POIs extracted, the facility information distribution unit 522 transmits null list information to the navigation device 100.

The search execution unit 105 determines whether or not there are one or more hits as a result of the remote search (Step S105). Specifically, the search execution unit 105 determines whether or not the list retrieved as a result of the remote search includes one or more POIs.

When there are one or more hits (when the determination of Step S105 results in "Yes"), the search execution unit 105 caches the results. The search result presentation unit 106 then instructs the output processing unit 103 to output the results as a list that enables selection (Step S106).

When there are no hits (when the determination of Step S105 results in "No"), the search execution unit 105 executes the local search (Step S107). Specifically, the search execution unit 105 extracts, from the facility table 300, the POI that satisfies the search condition and includes the search word.

The search execution unit 105 determines whether or not there are one or more hits as a result of the local search (Step S108). Specifically, the search execution unit 105 determines whether or not the list retrieved as a result of the local search includes one or more POIs.

When there are one or more hits (when the determination of Step S108 results in "Yes"), the search execution unit 105 caches the results. The search result presentation unit 106 then instructs the output processing unit 103 to output the results as a list that enables selection (Step S109).

When there are no hits (when the determination of Step S108 results in "No"), the search result presentation unit 106 instructs the output processing unit 103 to output the fact that the search result cannot be retrieved, and brings the search and retrieval processing to an end. The processing performed when the type of the search flag that is in the ON state is the remote search is as described above.

When the type of the search flag that is in the ON state is the local search (when the determination of Step S103 results in "LOCAL"), the search execution unit 105 executes the local search (Step S110). Specifically, the search execution unit 105 extracts, from the facility table 300, the POI that satisfies the search condition and includes the search word.

The search execution unit 105 determines whether or not there are one or more hits as a result of the local search (Step S111). Specifically, the search execution unit 105 determines whether or not the list retrieved as a result of the local search includes one or more POIs.

When there are one or more hits (when the determination of Step S111 results in "Yes"), the search execution unit 105 caches the results. The search result presentation unit 106 then instructs the output processing unit 103 to output the results as a list that enables selection (Step S112).

When there are no hits (when the determination of Step S111 results in "No"), the search execution unit 105 executes the remote search (Step S113). Specifically, the search execution unit 105 transmits other search conditions including the search word to the facility information providing server 500 and receives the search result transmitted from the facility information providing server 500. Note that, on the facility information providing server 500, the facility search unit 521 extracts, from the facility table 512, the POI that satisfies the received search condition and includes the search word. The facility information distribution unit 522 then lists the POIs retrieved as a result of the extraction to transmit the list to the navigation device 100. Note that, when there are no POIs extracted, the facility information distribution unit 522 transmits null list information to the navigation device 100.

The search execution unit 105 determines whether or not there are one or more hits as a result of the remote search (Step S114). Specifically, the search execution unit 105 determines whether or not the list retrieved as a result of the remote search includes one or more POIs.

When there are one or more hits (when the determination of Step S114 results in "Yes"), the search execution unit 105 caches the results. The search result presentation unit 106 then instructs the output processing unit 103 to output the results as a list that enables selection (Step S115).

When there are no hits (when the determination of Step S114 results in "No"), the search result presentation unit 106 instructs the output processing unit 103 to output the fact that the search result cannot be retrieved, and brings the search and retrieval processing to an end. The processing performed when the type of the search flag that is in the ON state is the local search is as described above.

When the type of the search flag that is in the ON state is the all search, that is, the remote search and the local search (when the determination of Step S103 results in "REMOTE AND LOCAL"), the search execution unit 105 executes the local search and executes the remote search as well (Step S120). Specifically, the search execution unit 105 extracts, from the facility table 300, the POI that satisfies the search condition and includes the search word, and transmits other search conditions including the search word to the facility information providing server 500 to receive the search results transmitted from the facility information providing server 500. Note that, on the facility information providing server 500, the facility search unit 521 extracts, from the facility table 512, the POI that satisfies the received search condition and includes the search word. The facility information distribution unit 522 then lists the POIs retrieved as a result of the extraction to transmit the list to the navigation device 100. Note that, when there are no POIs extracted, the facility information distribution unit 522 transmits null list information to the navigation device 100.

The search execution unit 105 determines whether or not there are one or more hits as a result of the local search (Step S121). Specifically, the search execution unit 105 determines whether or not the list retrieved as a result of the local search includes one or more POIs.

When there are one or more hits (when the determination of Step 121 results in "Yes"), the search execution unit 105 determines whether or not there are one or more hits as a result of the remote search (Step S122). Specifically, the search execution unit 105 determines whether or not the list retrieved as a result of the remote search includes one or more POIs.

When there are no hits as a result of the remote search (when the determination of Step S122 results in "No"), the search result presentation unit 106 caches the results retrieved as a result of the local search. The search result presentation unit 106 then instructs the output processing unit 103 to output the results as a list that enables selection (Step S123).

When there are one or more hits as a result of the remote search (when the determination of Step S122 results in "Yes"), the search result presentation unit 106 caches the results retrieved as a result of the local search, and caches the results retrieved as a result of the remote search as well. The search result presentation unit 106 then instructs the output processing unit 103 to merge the results of both searches to output the merged results as the list that enables selection (Step S124). Note that, although the duplicated POIs are deduplicated through the merging processing, information specifying the search source of the POIs, such as separate pieces of information each indicating "LOCAL" or "REMOTE", may be stored for each of the POIs to be displayed.

When there are no hits as a result of the local search (when the determination of Step S121 results in "No"), the search execution unit 105 determines whether or not the list retrieved as a result of the remote search includes one or more POIs (Step S125).

When there are one or more hits as a result of the remote search (when the determination of Step S125 results in "Yes"), the search execution unit 105 caches the results of the remote search. The search result presentation unit 106 then instructs the output processing unit 103 to output the results as a list that enables selection (Step S126).

When there are no hits as a result of the remote search (when the determination of Step S125 results in "No"), the search result presentation unit 106 instructs the output processing unit 103 to output the fact that the search results cannot be retrieved, and brings the search and retrieval processing to an end. The processing performed when the type of the search flag that is in the ON state is the all search is as described above.

The processing flow of the search and retrieval processing is as described above. According to the search and retrieval processing, it is possible to specify the search target to execute a search depending on the search target. When a search based on the storage device 3 or the ROM device 6 (local search) is executed, the facility table 300 is used to execute a search by the designated method. When a search based on the information stored in the facility information providing server 500 (remote search) is executed, the facility information providing server 500 is requested to search for the facility information, and the results of the search are retrieved. Even when a search based on the storage device 3 or the ROM device 6 (local search) is executed, in a case where there are no results retrieved (0 hits), a search based on the information stored in the facility information providing server 500 (remote search) is executed to retrieve the results of the search. Similarly, even when a search based on the information stored in the facility information providing server 500 (remote search) is executed, in a case where there are no results retrieved (0 hits), the facility table 300 is used to execute a search by the designated method (local search), and the results of the search are retrieved. When a search based on the information stored in the facility information providing server 500 is executed in addition to a search based on the information stored in the storage device 3 or the ROM device 6, the search execution unit 105 retrieves the results of both searches (local and remote search).

Figure 9:
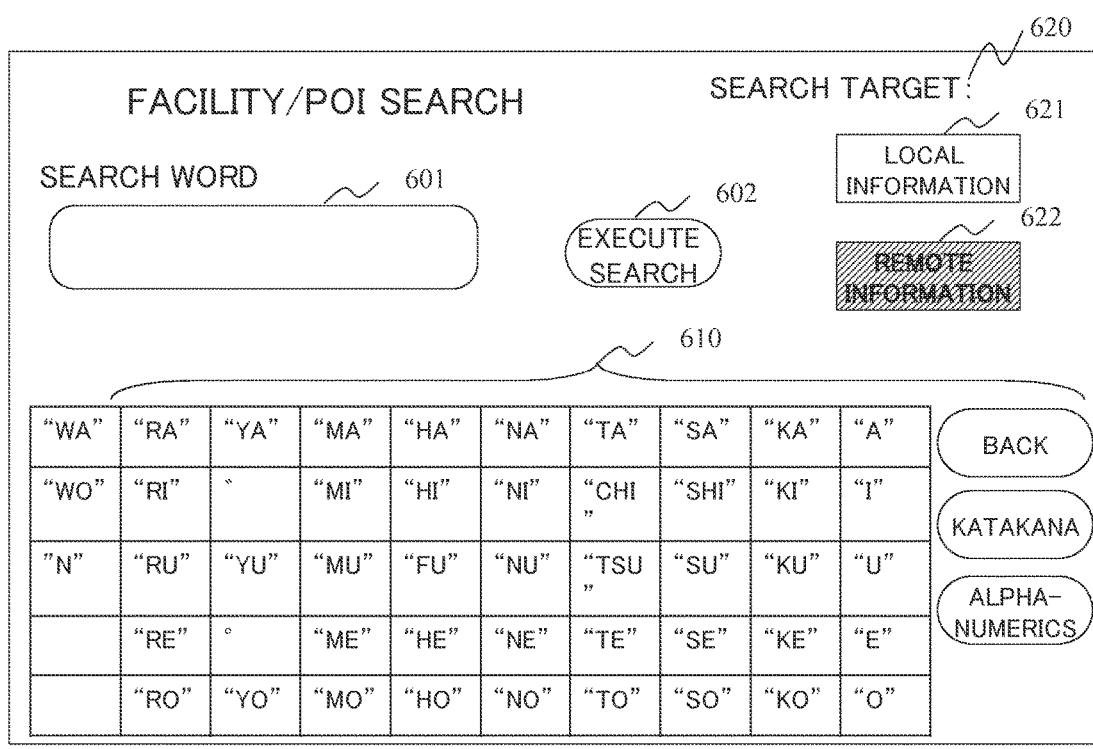
FIG. 9 is a diagram illustrating an example of a search screen.

FIG. 9 is a diagram illustrating an example of a search input screen. The search input screen is a screen displayed on the display 2 by the output processing unit 103 of the navigation device 100 in order to specify the search condition.

On the search input screen, there are displayed a search word input field 601, a search execution instruction reception button 602, a software keyboard 610 which assists the user in inputting the search word, a search target display area 620 which indicates which of the search targets are to be searched under the search condition in question, a "local information" indicator 621 which indicates that the local search is to be executed, and a "remote information" indicator 622 which indicates that the remote search is to be executed.

In the search word input field 601, a letter string received by the software keyboard 610 is displayed. When the received letter string is displayed in the search word input field 601, the search target specifying processing is performed to specify the search target based on information input at the time of the processing. Moreover, the search target is specified every time the processing is performed, and one or both of the "local information" indicator 621 and the "remote information" indicator 622 of the search target display area 620 are displayed while being switched between an enabled state and a disabled state depending on the search target.

When an input to the search execution instruction reception button 602 is received, the search and retrieval processing described above is executed.

Figure 10:
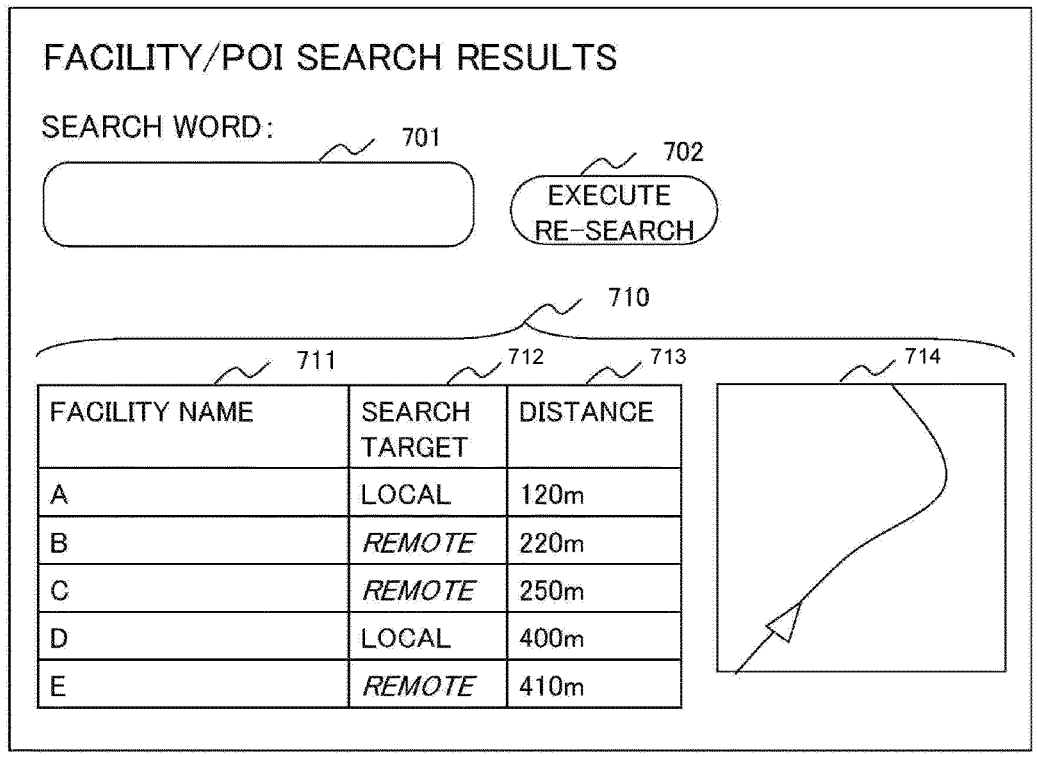
FIG. 10 is a diagram illustrating an example of a search result screen.

FIG. 10 is a diagram illustrating a display example of a result display screen which displays the list of the POIs retrieved as a result of the POI search in a manner that enables selection. On the result display screen, there are displayed a search word input field 701, a re-search execution instruction reception button 702, and a result display area 710 which displays the search results.

In the search word input field 701, a letter string that has been input and received is displayed. The search word input field 701 receives a touch input, and when the touch input is received, the software keyboard 610 such as the one illustrated in FIG. 9 is displayed while being superimposed on the result display area 710 to receive input information. In the result display area 710, the list of the corresponding POIs retrieved as a result of the search is displayed in a manner that enables selection. The result display area 710 includes a facility name display field 711, a search target display field 712, a distance display field 713, and a map display area 714, which display the name of the POI, information specifying which of the local search and the remote search has been used to search for the POI in question, a distance from the current location to the POI, and a simple map including the POI and the current location, respectively.

When detecting an input to any one of the POIs, which are displayed in the result display area 710 in a list format in a manner that enables selection, the basic control unit 101 determines that the POI that has been input and received is designated as the destination or the via point to perform processing of setting the destination or the via point.

One embodiment of the present invention has been described in the above. According to the one embodiment of the present invention, the navigation system 1000 enables the user to search for the POI in an appropriate manner. More specifically, in other words, it is possible to appropriately select a database as the search target based on the type of the search, the search condition, and the like to search the selected database.

The present invention is not limited to the embodiment described above. Various modifications can be made to the above-mentioned embodiment within the scope of the technical idea of the present invention. For example, in the above-mentioned embodiment, the description has been given of the example in which the facility information providing server 500 to be the target of the remote search is only one, but the present invention is not limited to this example. A plurality of the facility information providing servers 500 may be provided, and the respective facility information providing servers 500 may search for different types of POIs. For example, one of the facility information providing servers 500 may abundantly store the POIs of restaurants and search those stored POIs quickly, and another one of the facility information providing servers 500 may abundantly store the POIs of road-side facilities such as a gas station and search those stored POIs quickly. In this case, the search target specifying processing may involve, in a search that designates a specific genre, specifying a predetermined facility information providing server 500 that corresponds to the specific genre to provide a search flag therefor, and then executing a search. In this manner, it is possible to efficiently execute a search for the POI that is more specialized and more accurate.

The present invention has been described in the above with a focus on the one embodiment and the modified example. Note that, in the above-mentioned one embodiment and modified example, the description has been given of the example in which the present invention includes the navigation device. However, the present invention is applicable not only to the navigation device, but also to the navigation system in general that uses a device in general which guides the user to a route of the moving object, for example, the information terminal in general such as a cellular phone, a personal digital assistant (PDA), a mobile PC, or a music player.

REFERENCE SIGNS LIST

1 . . . arithmetic processing unit, 2 . . . display, 3 . . . storage device, 4 . . . audio input/output device, 5 . . . input device, 6 . . . ROM device, 7 . . . vehicle speed sensor, 8 . . . gyroscope, 9 . . . GPS receiver, 10 . . . FM multiplex broadcast receiver, 11 . . . beacon receiver, 12 . . . communication device, 21 . . . CPU, 22 . . . RAM, 23 . . . ROM, 24 . . . I/F, 25 . . . bus, 30 . . . network, 41 . . . microphone, 42 . . . speaker, 51 . . . touch panel, 52 . . . dial switch, 100 . . . navigation device, 101 . . . basic control unit, 102 . . . input reception unit, 103 . . . output processing unit, 104 . . . search target specifying unit, 105 . . . search execution unit, 106 . . . search result presentation unit, 200, 511 . . . link table, 300, 512 . . . facility table, 500 . . . facility information providing server, 510 . . . storage unit, 520 . . . control unit, 521 . . . facility search unit, 522 . . . facility information distribution unit, 530 . . . transmission/reception unit

The invention claimed is:

1. An information terminal, comprising:
a storage unit that stores information on buildings or specific spots;
a search unit that searches and retrieves the buildings or specific spots stored in the storage unit based on a designated search condition;
an arithmetic processing unit that requests, via a network, an information providing server to provide the information on the buildings or specific spots based on the designated search condition;
a search target specifying unit that determines which of the search unit and the arithmetic processing unit is to be used to search and retrieve the buildings or specific spots; and
a result displaying element that displays results retrieved by the search unit or the arithmetic processing unit,
wherein the search target specifying unit determines which of the search and arithmetic processing units is to be used to search and retrieve the buildings or specific spots based on the designated search condition, wherein a search of local information stored in the storage unit is determined when a single word is input as the designated search condition and a search of remote information stored in the information providing server is determined when multiple words distinguished from one another by a space or other predetermined delimiter character describing a destination genre and not an address or telephone number are input as the designated search condition, wherein the search target specifying unit determines that the arithmetic processing unit is to be used to search and retrieve the buildings or specific spots when the designated search condition is a search condition that searches for a building or specific spot corresponding to a specific genre, wherein when there are a plurality of input words, a search for remote information is executed, wherein when there is not a plurality of input words, and the input is an address or a telephone number, or the input does not correspond to a search for a specific genre, a search for local information only is executed, and wherein when there is not a plurality of input words, and the input is not an address or a telephone number, and the input does correspond to a search for a specific genre, a search for local information and remote information is executed.

2. An information terminal according to claim 1, wherein the search target specifying unit determines that the arithmetic processing unit is to be used to search and retrieve the buildings or specific spots when the designated search condition is a predetermined search condition that imposes a heavy search processing load.

3. An information terminal according to claim 1, wherein the search target specifying unit determines that the arithmetic processing unit is to be used to search and retrieve the buildings or specific spots when the designated search condition is a search condition that specifies a type of the building or specific spot whose data is frequently updated.

4. An information terminal, comprising:
a storage unit that stores information on buildings or specific spots;
a search unit that searches and retrieves the buildings or specific spots stored in the storage unit based on a designated search condition;
an arithmetic processing unit that requests, via a network, an information providing server to provide the information on the buildings or specific spots based on the designated search condition;
a search target specifying unit that determines which of the search unit and the arithmetic processing unit is to be used to search and retrieve the buildings or specific spots; and
a result displaying element that displays results retrieved by the search unit or the arithmetic processing unit,
wherein the search target specifying unit determines which of the search and arithmetic processing units is to be used to search and retrieve the buildings or specific spots based on the designated search condition,
wherein a search of local information stored in the storage unit is determined when a single word is input as the designated search condition and a search of remote information stored in the information providing server is determined when multiple words distinguished from one another by a space or other predetermined delimiter character describing a destination genre and not an address or telephone number are input as the designated search condition,
wherein the search target specifying unit determines that the arithmetic processing unit is to be used to search and retrieve the buildings or specific spots when multiple search words are input as the designated search condition,
wherein when there are a plurality of input words, a search for remote information is executed,
wherein when there is not a plurality of input words, and the input is an address or a telephone number, or the input does not correspond to a search for a specific genre, a search for local information only is executed, and
wherein when there is not a plurality of input words, and the input is not an address or a telephone number, and the input does correspond to a search for a specific genre, a search for local information and remote information is executed.

5. An information terminal according to claim 1, wherein the search target specifying unit determines not to use the determination made of which of the search unit and the arithmetic processing unit is to be used when sufficient search results have not been retrieved.

6. An information terminal according to claim 1, wherein, when the results retrieved by one of the search unit and the arithmetic processing unit and the results retrieved by another thereof are duplicated, the result displaying element merges the results of both of the search unit and the arithmetic processing unit to display merged results.

7. An information terminal according to claim 1, further comprising a search input screen that displays information specifying which of local information stored in the storage unit and remote information stored in the information providing server has been retrieved.

8. An information terminal according to claim 4, further comprising a search input screen that displays information specifying which of local information stored in the storage unit and remote information stored in the information providing server has been retrieved.

9. A non-transitory storage medium that is computer readable and writable used in a navigation device including a program for implementing processing of function units of an information terminal, the information terminal comprising:
a storage unit that stores information on buildings or specific spots, a search unit that searches and retrieves the buildings or specific spots stored in the storage unit based on a designated search condition,
an arithmetic processing unit that requests, via a network, an information providing server to provide the information on the buildings or specific spots based on the designated search condition,
a search target specifying unit that determines which of the search unit and the arithmetic processing unit is to be used to search and retrieve the buildings or spots, and a result displaying element that displays results retrieved by the search unit or the arithmetic processing unit,
wherein a search of local information stored in the storage unit is determined when a single word is input as the designated search condition and a search of remote information stored in the information providing server is determined when multiple words distinguished from one another by a space or other predetermined delimiter character describing a destination genre and not an address or telephone number are input as the designated search condition, wherein the program operates the search target specifying unit to determine which of the search and arithmetic processing units is to be used to search and retrieve the buildings or specific spots based on the designated search condition, and to determine that the arithmetic processing unit is to be used to search and retrieve the buildings or specific spots when the designated search condition is a search condition that searches for a building or specific spot corresponding to a specific genre, wherein when there are a plurality of input words, a search for remote information is executed, wherein when there is not a plurality of input words, and the input is an address or a telephone number, or the input does not correspond to a search for a specific genre, a search for local information only is executed, and wherein when there is not a plurality of input words, and the input is not an address or a telephone number, and the input does correspond to a search for a specific genre, a search for local information and remote information is executed.

10. The medium according to claim 9, wherein, when the results retrieved by one of the search unit and the arithmetic processing unit and the results retrieved by another thereof are duplicated, the result displaying element merges the results of both of the search unit and the arithmetic processing unit to display merged results.

11. The medium according to claim 9, wherein a search input screen displays information specifying which of local information stored in the storage unit and remote information stored in the information providing server has been retrieved.

* * * * *